(12) United States Patent
Ueshima

(10) Patent No.: US 7,335,105 B2
(45) Date of Patent: Feb. 26, 2008

(54) SOCCER GAME APPARATUS

(75) Inventor: Hiromu Ueshima, Shiga (JP)

(73) Assignee: SSD Company Limited, Kusatsu-shi (JP)

( * ) Notice: Subject to any disclaimer, the term of this patent is extended or adjusted under 35 U.S.C. 154(b) by 901 days.

(21) Appl. No.: 10/223,214

(22) Filed: Aug. 20, 2002

(65) Prior Publication Data

US 2003/0036417 A1 Feb. 20, 2003

Related U.S. Application Data

(60) Provisional application No. 60/373,599, filed on Apr. 19, 2002.

(30) Foreign Application Priority Data

Aug. 20, 2001 (JP) .............................. 2001-248582

(51) Int. Cl.
*A63F 13/00* (2006.01)
*A63F 9/24* (2006.01)
*A63F 13/02* (2006.01)
*A63F 9/00* (2006.01)
*G60F 17/00* (2006.01)
*G60F 19/00* (2006.01)
*A63B 71/00* (2006.01)

(52) U.S. Cl. .............................. 463/36; 463/1; 463/23; 463/39; 463/40; 273/148 R; 273/148 B

(58) Field of Classification Search ............... 463/1–8, 463/30–43, 46, 47; 273/148 R, 148 B, 440, 273/440.1, 445, 447, 451, 454
See application file for complete search history.

(56) References Cited

U.S. PATENT DOCUMENTS

| | | | | |
|---|---|---|---|---|
| 3,717,857 A | * | 2/1973 | Evans ................... | 340/870.13 |
| 4,695,953 A | * | 9/1987 | Blair et al. .................... | 463/3 |
| 5,139,261 A | * | 8/1992 | Openiano ..................... | 463/36 |
| 5,288,078 A | * | 2/1994 | Capper et al. ................. | 463/39 |
| 5,524,637 A | * | 6/1996 | Erickson ..................... | 600/592 |
| 5,607,361 A | * | 3/1997 | Mastandrea et al. ........ | 473/207 |
| 5,616,078 A | * | 4/1997 | Oh ................................. | 463/8 |
| 5,694,340 A | * | 12/1997 | Kim ........................... | 702/141 |
| 5,741,182 A | * | 4/1998 | Lipps et al. .................. | 463/36 |
| 5,989,157 A | | 11/1999 | Walton | |
| 6,030,290 A | * | 2/2000 | Powell ........................ | 463/36 |
| 6,472,798 B2 | * | 10/2002 | Kishimoto ................... | 310/344 |

FOREIGN PATENT DOCUMENTS

| | | |
|---|---|---|
| JP | 10-179935 | 7/1998 |
| JP | 2000-107444 | * 4/2000 |
| WO | 96/15766 | 2/1996 |

* cited by examiner

*Primary Examiner*—Robert E. Pezzuto
*Assistant Examiner*—Binh-An D Nguyen
(74) *Attorney, Agent, or Firm*—Arent Fox LLP

(57) ABSTRACT

A soccer game apparatus includes a game processor, and the game processor allows at least a character of a soccer ball to be displayed on a television monitor screen. An signal outputting device is attached to a player's leg, and when the player moves the leg, an acceleration correlation signal correlated with an acceleration as of that time is output from the signal outputting device. Upon receipt of the acceleration correlation signal by an infrared signal, for example, the game processor causes a change to the character of the soccer ball displayed on the screen.

10 Claims, 16 Drawing Sheets

SOCCER GAME APPARATUS

This nonprovisional application claims the benefit of U.S. Provisional Application No. 60/373,599, filed Apr. 19, 2002.

BACKGROUND OF THE INVENTION

1. Field of the Invention

The present invention relates to a soccer game apparatus. More specifically, the present invention relates to a soccer game apparatus in which at least a character of a soccer ball is displayed on a television monitor screen so as to play a soccer game, for example.

2. Description of the Prior Art

As for such a kind of a conventional soccer game apparatus, there was a soccer game apparatus in which a television game machine onto which a game software is loaded is connected to a television monitor, and a soccer playing field is displayed on a monitor screen, controlling a movable character such as a player or the like on the screen by a controller operated by a game player.

In the prior art, however, the game player merely operated an operation key by hand, and did not actually kick a ball. Therefore, the player lacks a real sensation or feeling of playing a soccer game.

SUMMARY OF THE INVENTION

Therefore, it is a primary object of the present invention to provide a novel soccer game apparatus.

It is another object of the present invention to provide a soccer game apparatus capable of enjoying a soccer game with a real sensation or feeling by using a television monitor.

The present invention is a soccer game apparatus for playing a soccer game by displaying on a television monitor screen at least a character of a soccer ball, and comprises: a signal outputting device attached to a player's leg and outputting an acceleration correlation signal correlated with an acceleration when the leg moves; and a game processor which receives the acceleration correlation signal so as to cause a change to the character of the soccer ball displayed on the screen.

At least a character of a soccer ball is displayed on the television monitor screen. The signal outputting device is attached to a player's leg, and when the player moves the leg, an acceleration correlation signal correlated with an acceleration as of that time is output from the signal outputting device. The game processor causes a change to the character of the soccer ball displayed on the screen upon receipt of the acceleration correlation signal concerned.

Preferably, the signal outputting device generates a digital signal in accordance with the acceleration correlation signal, and transmits this digital signal to the game processor. Further preferably, the digital signal is wirelessly transmitted to the game processor.

In a case that the signal outputting device includes a piezoelectric buzzer element, the acceleration correlation signal is a signal which shows a difference in electric potential produced in the piezoelectric buzzer element when the signal outputting device is displaced. Preferably, the piezoelectric buzzer element includes a metal plate and a piezoelectric ceramic plate provided on the metal plate, and is arranged on the signal outputting device in such a manner that a main surface of the piezoelectric ceramic plate is perpendicular to a displacing direction of the leg upon being attached to the leg.

According to the present invention, the character of the soccer ball on the screen is changed based on the acceleration correlation signal from the signal outputting device attached to the player's leg, so that it is possible to enjoy a soccer game with a real sensation or feeling by using a television monitor.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
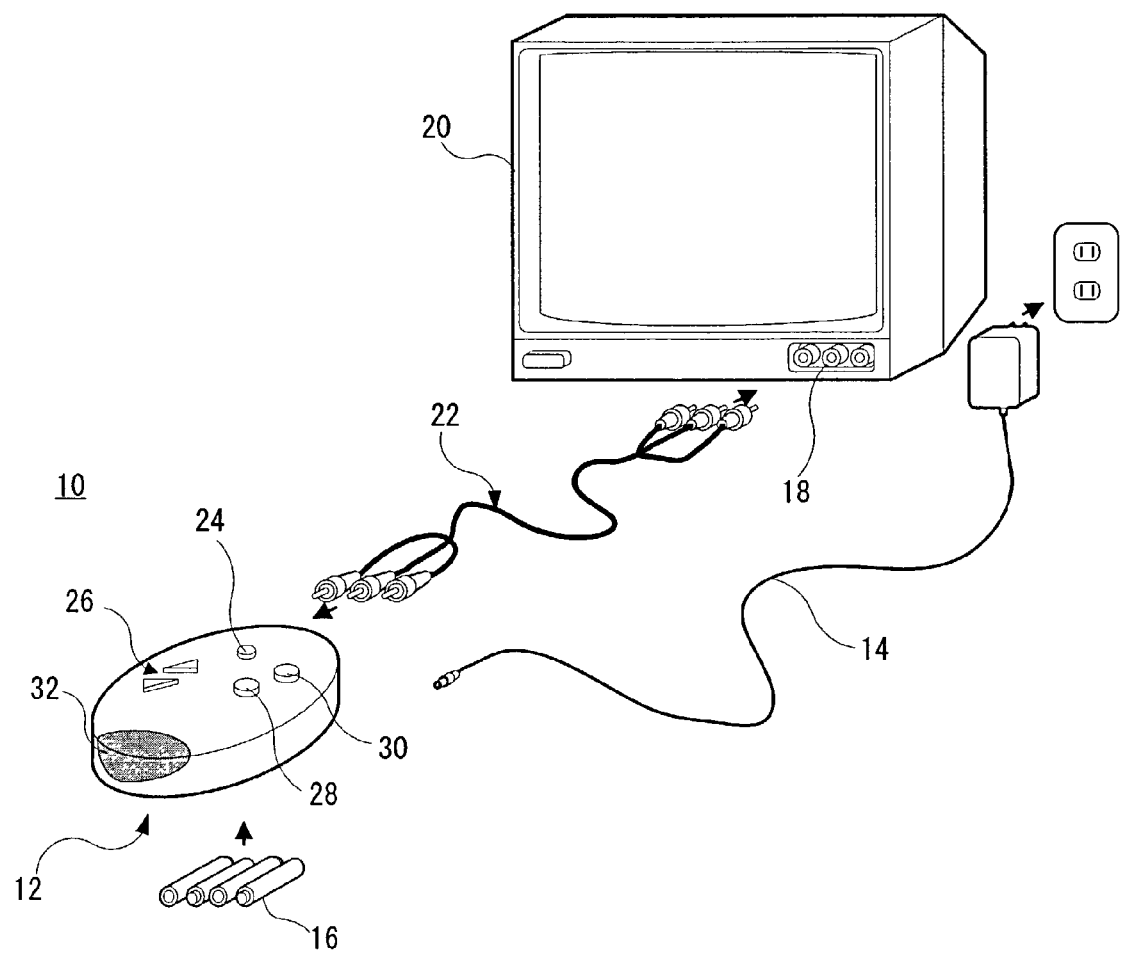
FIG. 1 is an illustrative view showing a game machine and a television monitor constituting a soccer game apparatus.

Referring to FIG. 1, a soccer game apparatus 10 of this embodiment includes a game machine 12, and a DC power is supplied to the game machine 12 by an AC adapter 14. However, a battery 16 may be used instead of the AC adapter 14. The game machine 12 is further connected to an AV terminal 18 of a television monitor 20 through an AV cable 22.

The game machine 12 further includes a housing. In addition to a power switch 24 provided on the housing 12, a selection key 26, a determination key 28 and a cancel key 30 are provided thereon. The selection key 26 is used for moving a cursor in order to select a menu or a game mode on the television monitor 20, for example. The determination key 28 is used for determining an input into the game machine 12. The cancel key 30 is used for canceling the input into the game machine 12. The game machine 12 is further provided with an infrared light-receiving portion 32, and the infrared light-receiving portion 32 receives an infrared signal from a infrared LED provided on an signal outputting device 34 shown in FIG. 2.

Figure 2:
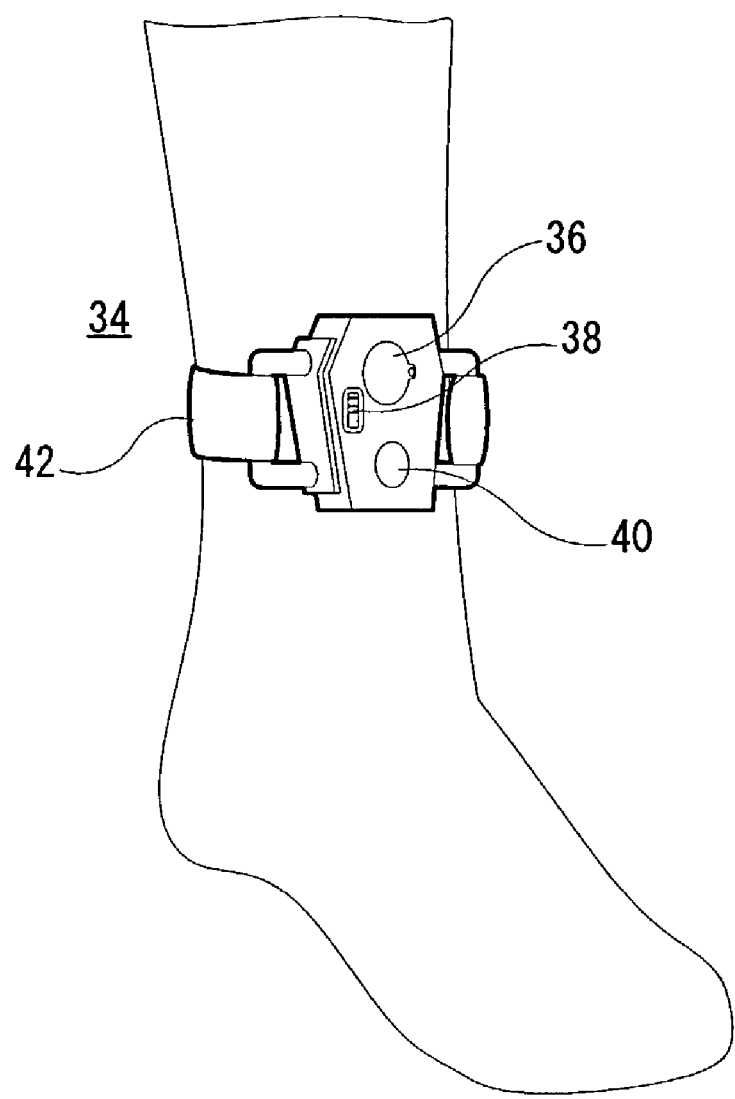
FIG. 2 is an illustrative view showing a state in which an signal outputting device constituting the soccer game apparatus is attached to a player's leg.

In this embodiment, two signal outputting devices 34 separately assigned to two game players are prepared. The signal outputting device 34 is attached to a shin of a player's dominant leg by an attaching belt 42 as shown in FIG. 2. A housing of the signal outputting device 34 is transparent, and a battery cover 36, a power switch 38 and a push key 40 are provided on a front surface thereon. The battery cover 36 is a cover for covering a battery that is a power source of the signal outputting device 34, the power switch 38 is a switch for turning on/off the power source of the signal outputting device 34, and the push key 40 is a key for moving the aforementioned cursor at a side of the signal outputting device 34. In addition, as described above, the infrared signal from the infrared LED is received by the infrared light-receiving portion 32 of the game machine 12. A piezoelectric buzzer element utilized as an acceleration sensor is provided on the signal outputting device 34 as described later, and the game machine 12 receives an acceleration correlation signal from the piezoelectric buzzer element so as to apply a change to a ball 44 on a game screen shown in FIG. 3.

Figure 3:
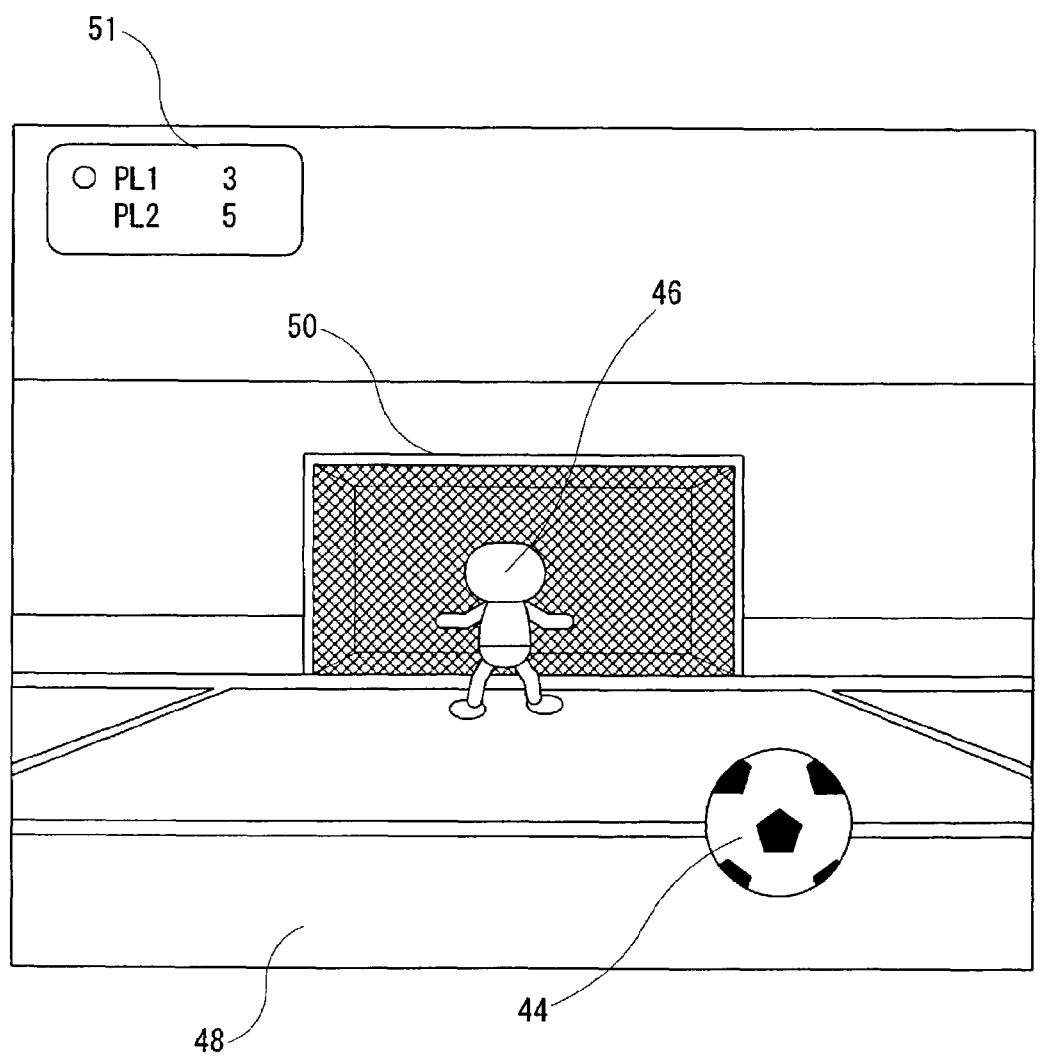
FIG. 3 is an illustrative view showing one example of a game screen displayed on the television monitor in FIG. 1 embodiment.

FIG. 3 is a game screen displayed on the television monitor 20 when the soccer game apparatus 10 is working. A soccer ball character 44 and a goalkeeper character 46 are displayed as a sprite image on the screen, and a ground character 48 and a goal character 50 are displayed as a text screen. In addition, a score display portion 51 for displaying a score of players 1 and 2 is formed on an upper left of the screen.

In the soccer game apparatus 10, the player actually moves his dominant leg to which the signal outputting device 34 is attached in tune with a moving timing of the soccer ball 44 displayed on the game screen. Then, the acceleration correlation signal based on a voltage variation of the piezoelectric buzzer element is transmitted from the infrared LED, and applied to the game processor via the infrared light-receiving portion 32 of the game machine 12. The game processor detects from the infrared signal a timing that a moving speed of the signal outputting device 34 reaches a maximum speed, and causes the soccer ball 44 to move toward the goal 50 as if the soccer ball 44 is bounced back by the player's leg in accordance with the detected timing and a position of the soccer ball 44 on the screen. Furthermore, it is recognized whether a successful shoot or an unsuccessful shoot in accordance with a position to which the soccer ball 44 has moved. However, in a case that there is a deviance between the timing of moving the signal outputting device and a position of the soccer ball 44 on the screen, it is recognized as kicking the air (attempting to kick the ball in vain), for example.

Figure 4:
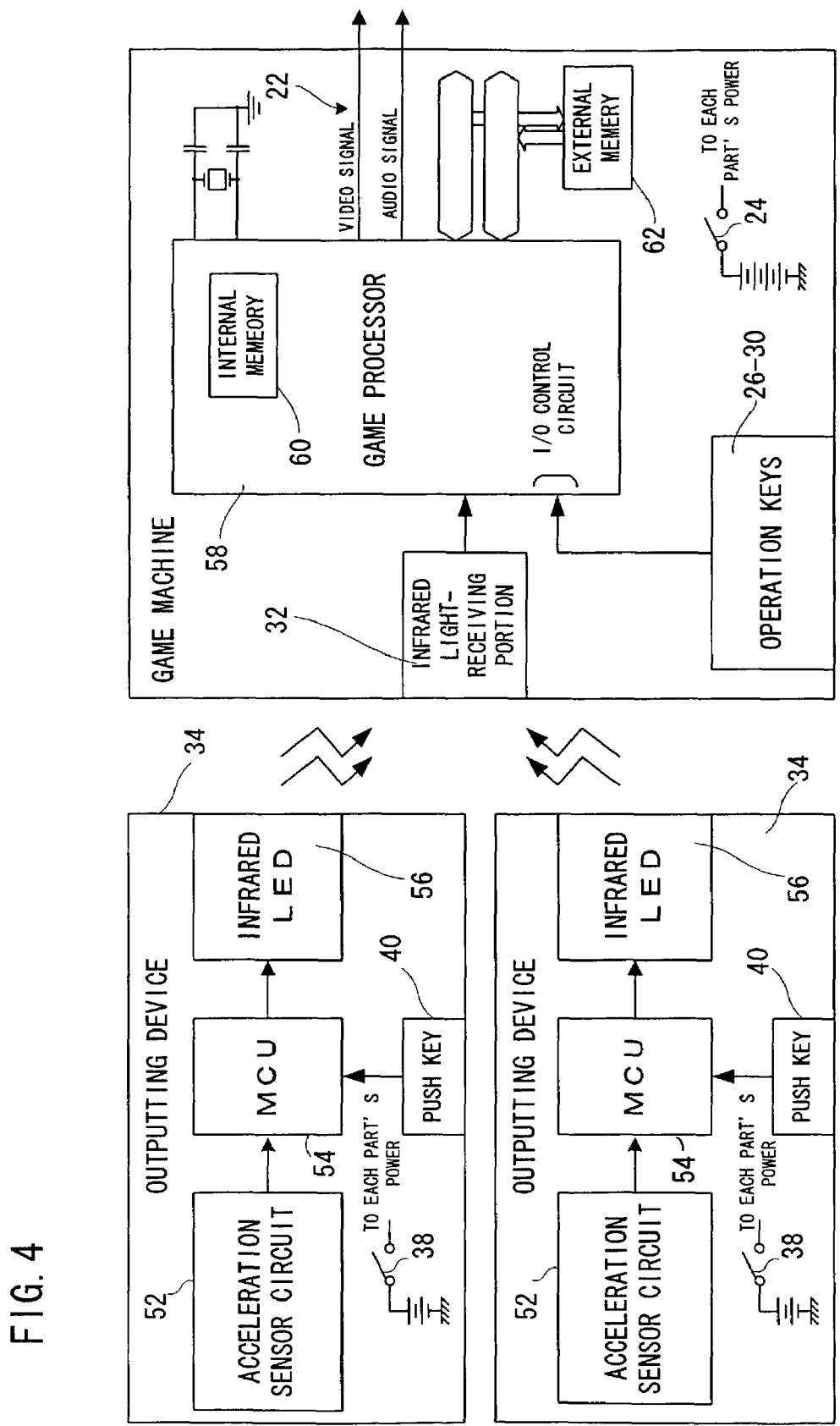
FIG. 4 is a block diagram showing one example of structure of the soccer game apparatus.
Figure 7:
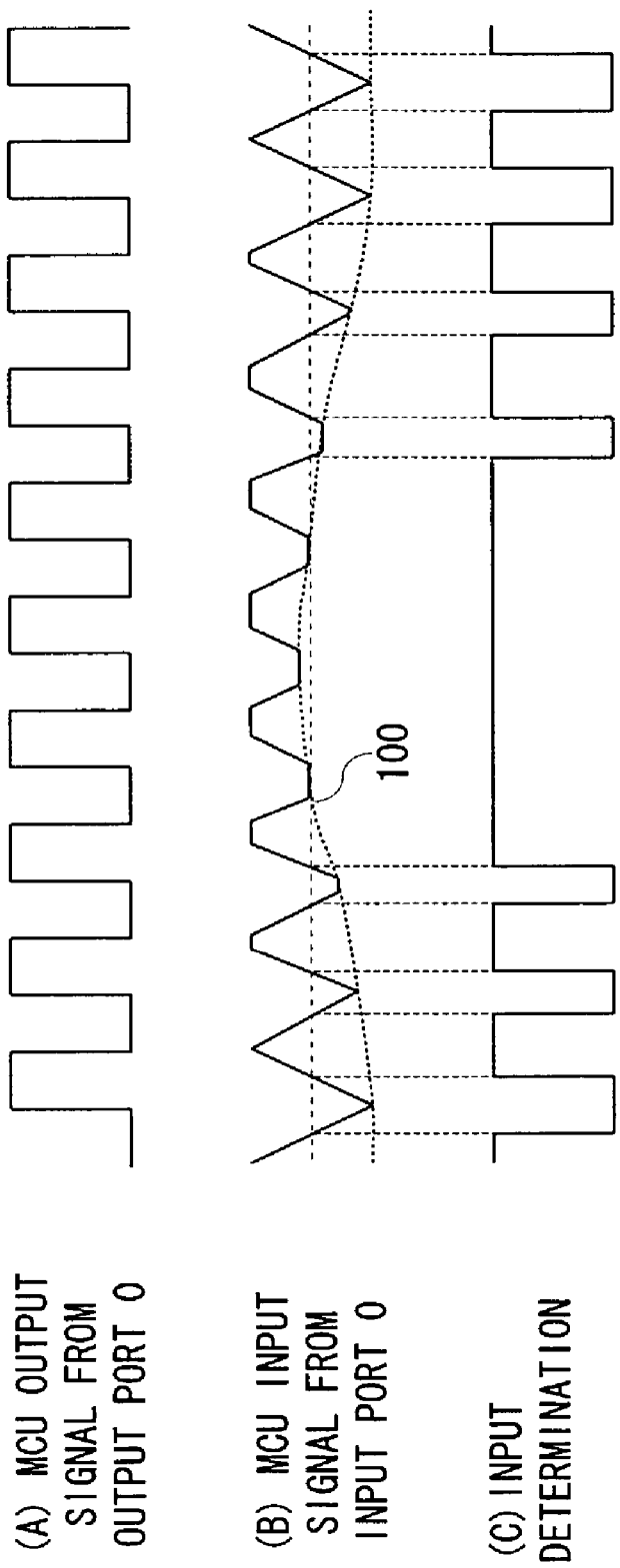
FIG. 7 is a waveform chart of each portion showing an operation of the signal outputting device.

Referring to FIG. 4, the signal outputting device 34 includes the infrared LED 56, the power switch 38 and the push key 40, as described above, and further contains an acceleration sensor circuit 52. The acceleration sensor circuit 52 includes a piezoelectric buzzer element 70 and its associated circuits as shown in FIG. 7 described later, and the acceleration correlation signal from the acceleration sensor circuit 52 is applied to the MCU 54. The MCU 54 is an 8-bit one-chip microcontroller, for example, and converts the acceleration correlation signal from the piezoelectric buzzer element 70 into a digital signal so as to be applied to the infrared LED 56.

A digitally-modulated infrared signal from the infrared LED 56 provided in two signal outputting devices 34 is received by the infrared light-receiving portion 32 of the game machine 12, and also digitally demodulated to be input into the game processor 58. One bit of the digital signal differs depending on the signal outputting device 34. With regard to a digital signal based on the infrared signal from the signal outputting device 34 attached to the game player 1, this one bit denotes "1", and with regard to a digital signal based on the infrared signal from the signal outputting device 34 attached to the game player 2, the one bit concerned denotes "0", for example. Therefore, the game processor 58 can determine a transmission source of the infrared signal by checking that bit.

An arbitrary kind of processor may be used as the game processor 58. However, in this embodiment, a high-speed processor developed by the assignee of the present invention and already filed as a patent application is used. This high-speed processor is disclosed in detail in Japanese Patent Laying-open No. H10-307790 □G06F13/36,15/78□and U.S. Pat. No. 6,070,205 corresponding thereto.

Although not shown, the game processor 58 includes various kinds of processors such as a CPU, a Picture Processor, a Sound Processor, a DMA controller, and so on, and also an A/D converter used in fetching an analog signal and an I/O control circuit which receives an input signal such as, a key operation signal, an infrared signal and so on and applies an output signal to an external equipment. Therefore, the demodulated signal from the infrared light-receiving portion 32 and the input signal from the operation keys 26-30 are applied to the CPU via the I/O control circuit. The CPU carries out a required operation according to the input signal so as to apply an operation result to the graphic processor or the like. Therefore, the graphic processor and the sound processor carry out an image process and a sound process according to the operation result.

An internal memory 60 is provided inside the processor 58, and the internal memory 60 includes a ROM or a RAM (SRAM and/or DRAM). The RAM is used as a temporary memory, a working memory, a counter or a register area (temporary data area) and a flag area. It is noted that an external memory 62 (ROM and/or RAM) is connected to the processor 58 through an external bus. A game program is in advance stored in the external memory 62.

The game processor 58 carries out an operation, a graphic process, a sound process, and so on by the above-described respective processors according to the input signal from the infrared light-receiving portion 32 and the operation keys 26-30, and outputs a video signal and an audio signal. The video signal is a signal composed of the text screen and the sprite image shown in FIG. 3 described above. These video and audio signals are applied to the television monitor 20 through the AV cable 22 and the AV terminal 18. Therefore, a game image shown in FIG. 3 is displayed along with a necessary sound (sound effect, game music) on the television monitor 20.

In the soccer game apparatus 10, to be simply described, the game machine 12, namely, the game processor 58 receives acceleration data included in the infrared signal from the two signal outputting devices 34 so as to determine a moving parameter of the soccer ball 44 (FIG. 3) when a moving acceleration of the signal outputting device 34 reaches a peak, causing the soccer ball 44 to move on the game screen according to the parameter.

Figure 5:
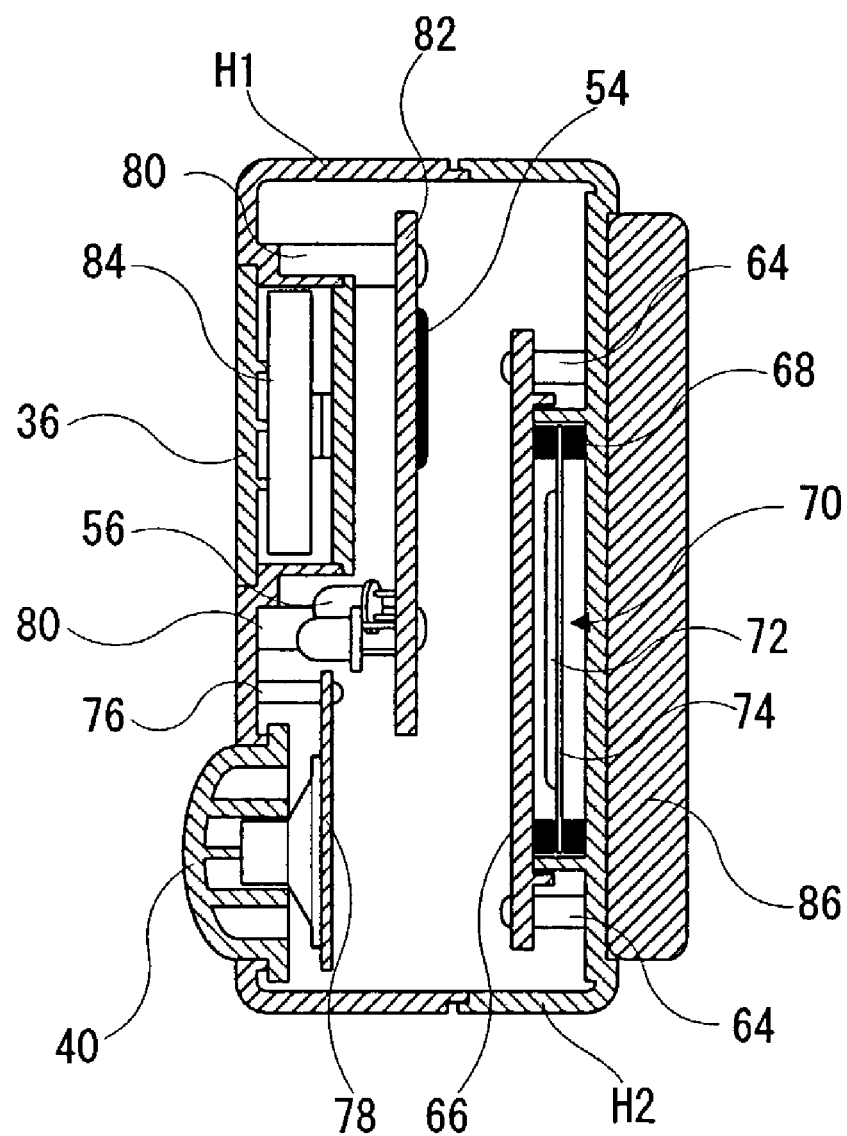
FIG. 5 is an illustrative view showing internal structure of the signal outputting device shown in FIG. 2.

The signal outputting device 34 includes two-halved plastic housings H1 and H2 and a sponge cushion 86 attached on the housing H2 as shown in FIG. 5. In attaching the signal outputting device 34, the player's leg contacts the sponge cushion 86, so that the player's leg can be protected.

A boss 80 is formed inside the housing H1, and a printed circuit board 82 is fixed to the boss 80. The MCU 54 shown in FIG. 4 is attached on one main surface of the printed circuit board 82, and the infrared LED 56 is attached on the other main surface. A battery box which houses the battery 84 is formed in a position corresponding to the printed circuit board 82 of the housing H1, and the battery box is covered with the battery cover 36. A boss 76 is further formed in the housing H1, and a printed circuit board 78 for attaching the push key 40 is attached in the boss 76. It is noted that at least a position corresponding to the infrared LED 80 of the housing H1 is transparent, and the infrared signal permeates the housing HI to be transmitted to the game machine 12.

A boss 64 is formed in the housing H2, and a piezoelectric buzzer cover 66 is fixed to the boss 64. A hollow portion is formed between the piezoelectric buzzer cover 66 and the housing H2, and the piezoelectric buzzer element 70 constituting the acceleration sensor circuit 52 shown in FIG. 4 is arranged in the hollow portion. More specifically, a rubber packing 68 is attached at a circumference of the hollow portion, and the piezoelectric buzzer element 70 is supported by the rubber packing 68. As well recognized, the piezoelectric buzzer element 70 includes a ceramic plate 72 attached on a metal plate 74, and a buzzer sound is produced by applying a voltage between the metal plate 74 and an electrode on the ceramic plate 72. The piezoelectric buzzer element 70 is provided inside the signal outputting device 34 in such a manner that a main surface of the ceramic plate 72 is perpendicular to a displacing direction of the leg when the signal outputting device 34 is attached to the leg.

In the present invention, the piezoelectric buzzer element 70 thus constituted is used as an acceleration sensor. That is, the ceramic plate 72 is a piezoelectric ceramic, and it is well known that an electric signal is produced from the piezoelectric ceramic when a stress activates on the piezoelectric ceramic. Then, in the present invention, an electric signal produced between the metal plate 74 and the aforementioned electrode in accordance with a movement of the piezoelectric buzzer element 72, namely, the signal outputting device 34 is taken out. However, in this embodiment, an acceleration correlation digital signal or data is fetched in the MCU 54 by carrying out a predetermined digital signal process according to the electric signal.

Figure 6:
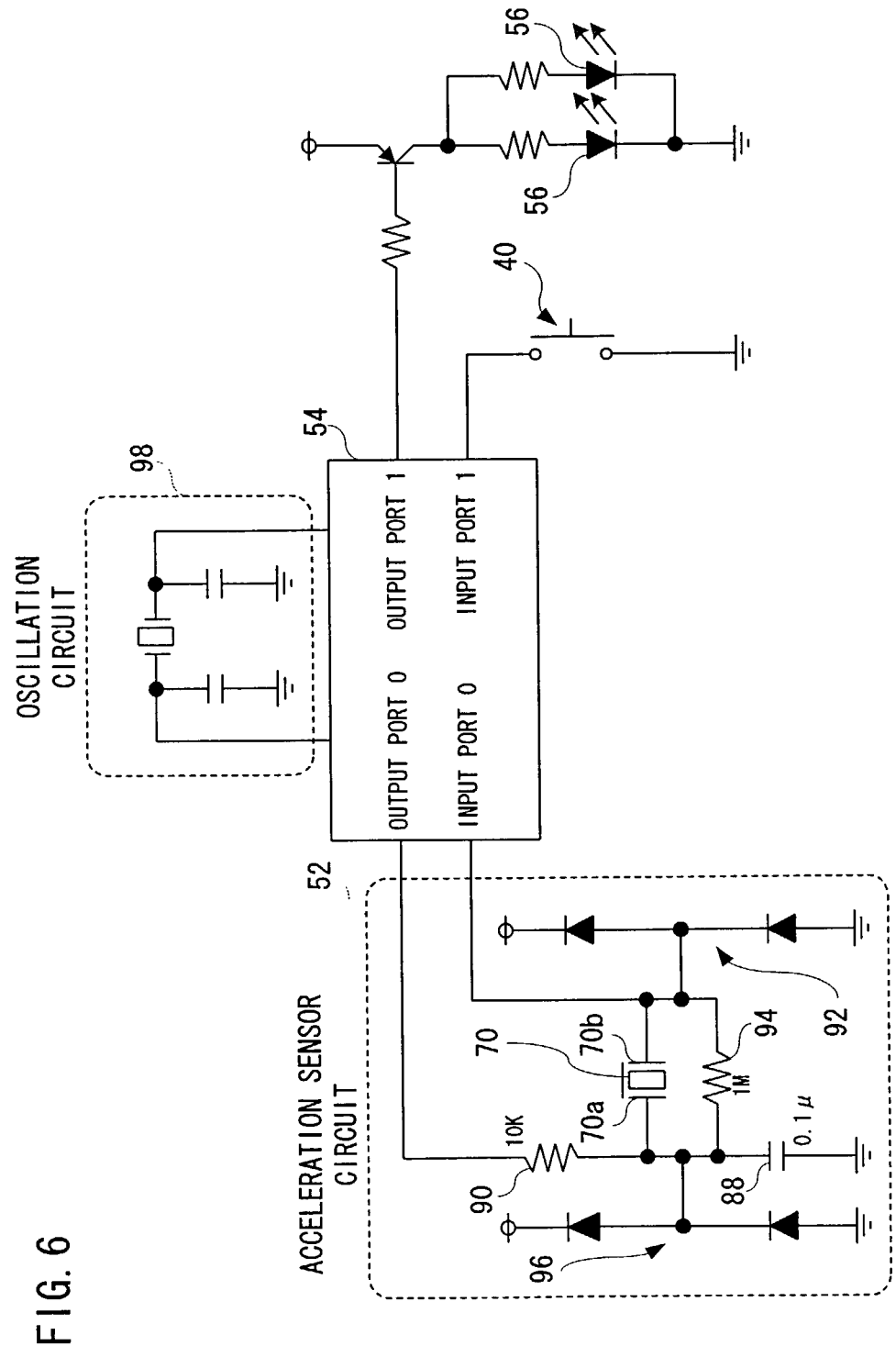
FIG. 6 is a circuit diagram of the signal outputting device.

Referring to FIG. 6, the piezoelectric buzzer element 70 described earlier is included in the acceleration sensor circuit 52. In addition, an external oscillation circuit 98 is provided on the MCU 54, and the MCU 54 operates in response to a clock signal from the oscillation circuit 98.

Furthermore, the MCU 54 outputs a rectangular waveform signal from an output port 0, and applies the signal to a one electrode 70a of the piezoelectric buzzer element 70 through a resistor 90 of 10 kΩ (kilo-Ohms), for example. The electrode 70a of the piezoelectric buzzer element 70 is the metal plate 74 and grounded via a capacitor 88 of 0.1 μF (micro-farads), for example. A diode circuit 96 is also connected to the electrode 70a, thereby to keep a deviation width of the voltage within a constant range.

The other electrode 70b of the piezoelectric buzzer element 70 is formed on the ceramic plate 72 and connected to an input port 0 of the MCU 54, and also to a diode circuit 96 which allows a deviation width of the voltage to be kept within a constant range. It is noted that the two electrodes 70a and 70b of the piezoelectric buzzer element 70 are electrically separated by a relatively high resistor 94 of 1 MΩ (micro-Ohms), for example.

When the rectangular waveform signal shown in FIG. 7(A) is applied to the electrode 70a of the piezoelectric buzzer element 70, a triangular waveform signal as in FIG. 7(B) is input into the input port 0 of the MCU 54 according to a charge and discharge of the capacitor 88. However, a magnitude (a peak value) of the rectangular waveform signal and a magnitude (a peak value) of the triangular waveform signal are restricted by the diode circuits 92 and 96, respectively.

When the signal outputting device 34 (FIG. 5) remains stationary, that is, when not displaced, a level on a minus (−) side of the triangular waveform signal does not change as shown in a far left side in FIG. 7(B). However, if the signal outputting device 34 is displaced by the player in a three-dimensional space, a voltage is produced in the piezoelectric buzzer element 70 due to a piezoelectric effect accompanied by the displacement. The acceleration correlation voltage biases the level on the minus side of the triangular waveform signal. Therefore, if the signal outputting device 34 is displaced, an acceleration correlation voltage at a level according to a magnitude of the displacement acceleration is produced in the piezoelectric buzzer element 70. Therefore, the level on the minus side of the triangular waveform signal being input to the inputting port 0 of the MCU 54 varies according to a level of the acceleration correlation voltage 100 as shown in FIG. 7(B).

The MCU 54 converts such the variance of the level on the minus side of the triangular waveform signal into acceleration data as described later, and drives the infrared LED 56 according to the acceleration data.

Figure 8:
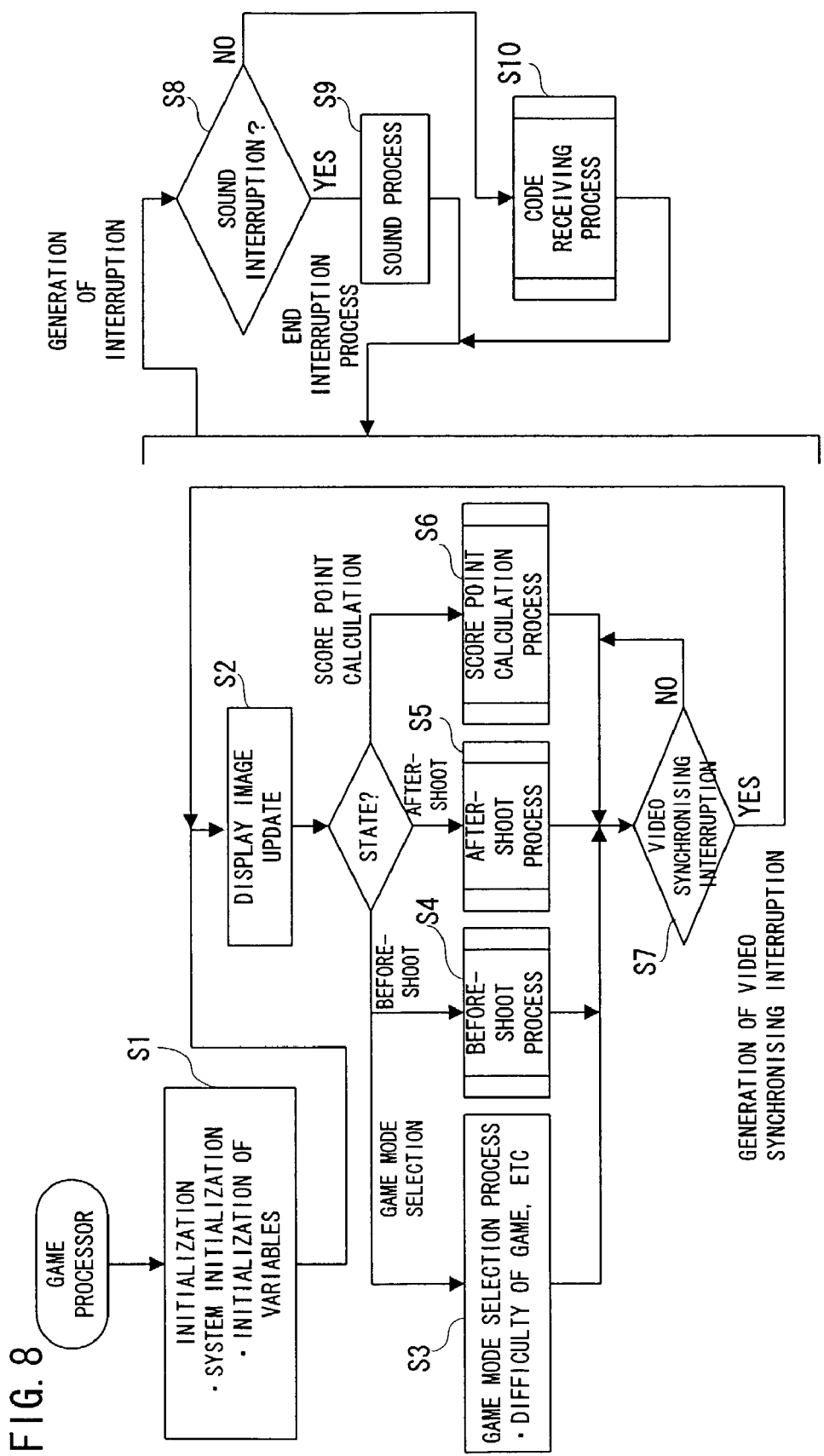
FIG. 8 is a flowchart showing a whole operation of a game processor provided in the game machine.
Figure 9:
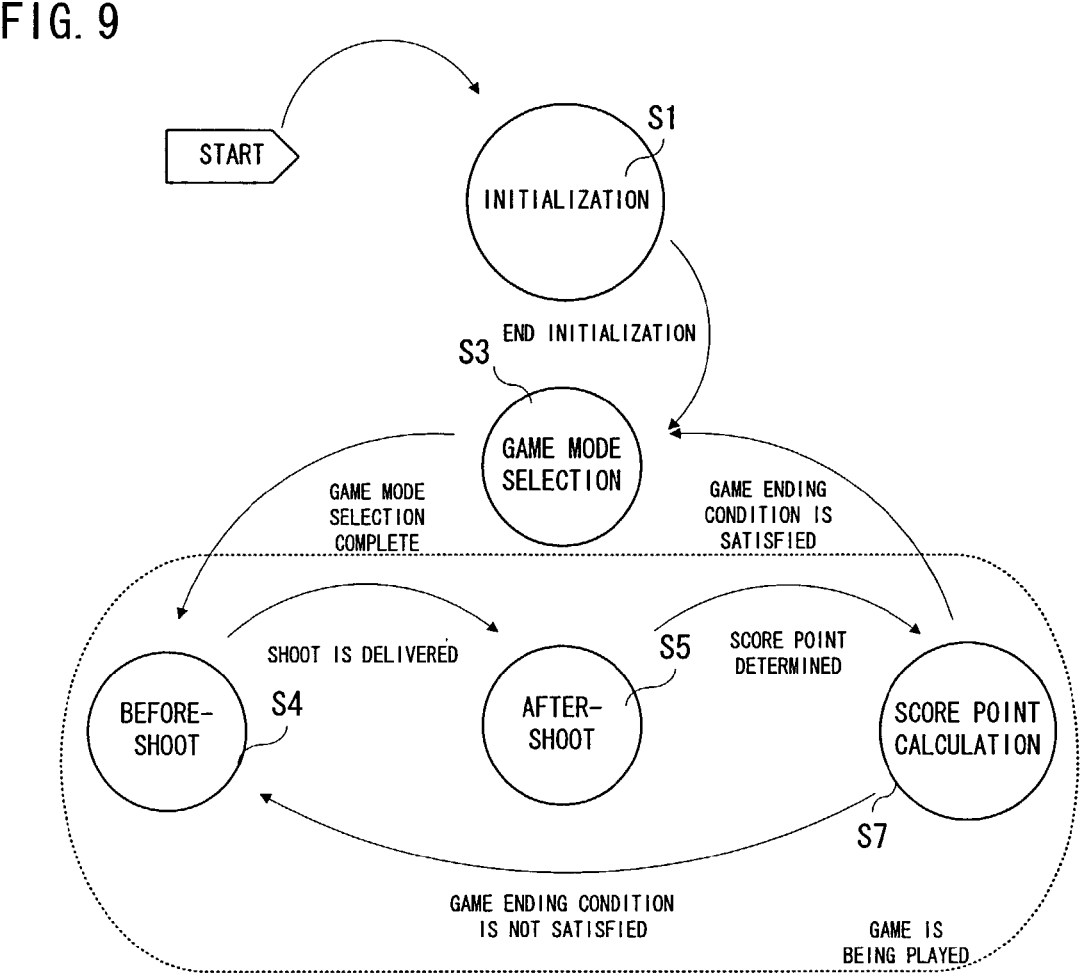
FIG. 9 is an illustrative view showing a state diagram of the game processor.

Here, referring to FIG. 8 and FIG. 9, descriptions are made with regard to a schematic operation of the soccer game apparatus 10 of this embodiment. The game is started by turning on the power switch 24 of the game machine 12 shown in FIG. 1 and the power switch 38 of the signal outputting device 34 shown in FIG. 2. Firstly, the game processor 58 shown in FIG. 4 carries out an initialization process in a step S1. More specifically, a system and respective variables are initialized.

Subsequently, the game processor 58 updates the image displayed on the monitor 20 by renewing an image signal in a step S2. However, the display image update is executed for each frame (television frame or video frame).

Then, the game processor 58 carries out a process in accordance with a state. However, a game mode selection is first to be processed. In the game mode selection, an operator or a game player operates the selection key 26 shown in FIG. 1 or the push key 40 shown in FIG. 2 so as to select a menu regarding a level of difficulty of the game, and so on, finalizing the menu by operating the determination key 28 or applying an acceleration to the signal outputting device 34 in a step S3 in FIG. 8.

Subsequently, the game processor 58 carries out a before-shoot process in a step S4, and carries out an after-shoot process in a step S5. In the before-shoot process, the soccer ball 44 is rolled toward the player from an oblique front right, for example, and when the shoot is done by the player, the process is changed to the after-shoot process. It is noted that when a shoot timing is too early or too late, a shoot result is determined as "miss the ball", and the process is not changed to the after-shoot process.

When transited to the after-shoot process, the soccer ball 44 is moved to a direction according to a timing of the shoot and a position of the soccer ball 44 as of that time, and furthermore, the goalkeeper 46 is moved to an arbitrary direction. The shoot result is determined as "goal successful" or "goal unsuccessful" in accordance with a moving direction of the soccer ball 44 and the position of the goalkeeper 46.

When the shoot result is finalized, the state is moved to a score point process in a succeeding step S6. In addition, the number of shoots is determined in the score point process, and the player is changed at a time that five shoots have been unleashed, for example. Furthermore, if both the player 1 and the player 2 carry out a shoot so that a game ending condition is satisfied, the process returns to the game mode selection (S3).

It is noted that if there is an interruption by a video-synchronising signal, the process returns from a step S7 to the step S2 so as to carry out the image update. In addition, a sound process in a step S9 is carried out when a sound interruption is generated, thereby producing a game music, sound effects such as a shoot sound, and so on. If an interruption other than the sound interruption is generated, the game processor 58 receives an infrared signal (code) input from the infrared light-receiving portion 32 in a step S10.

Figure 10:
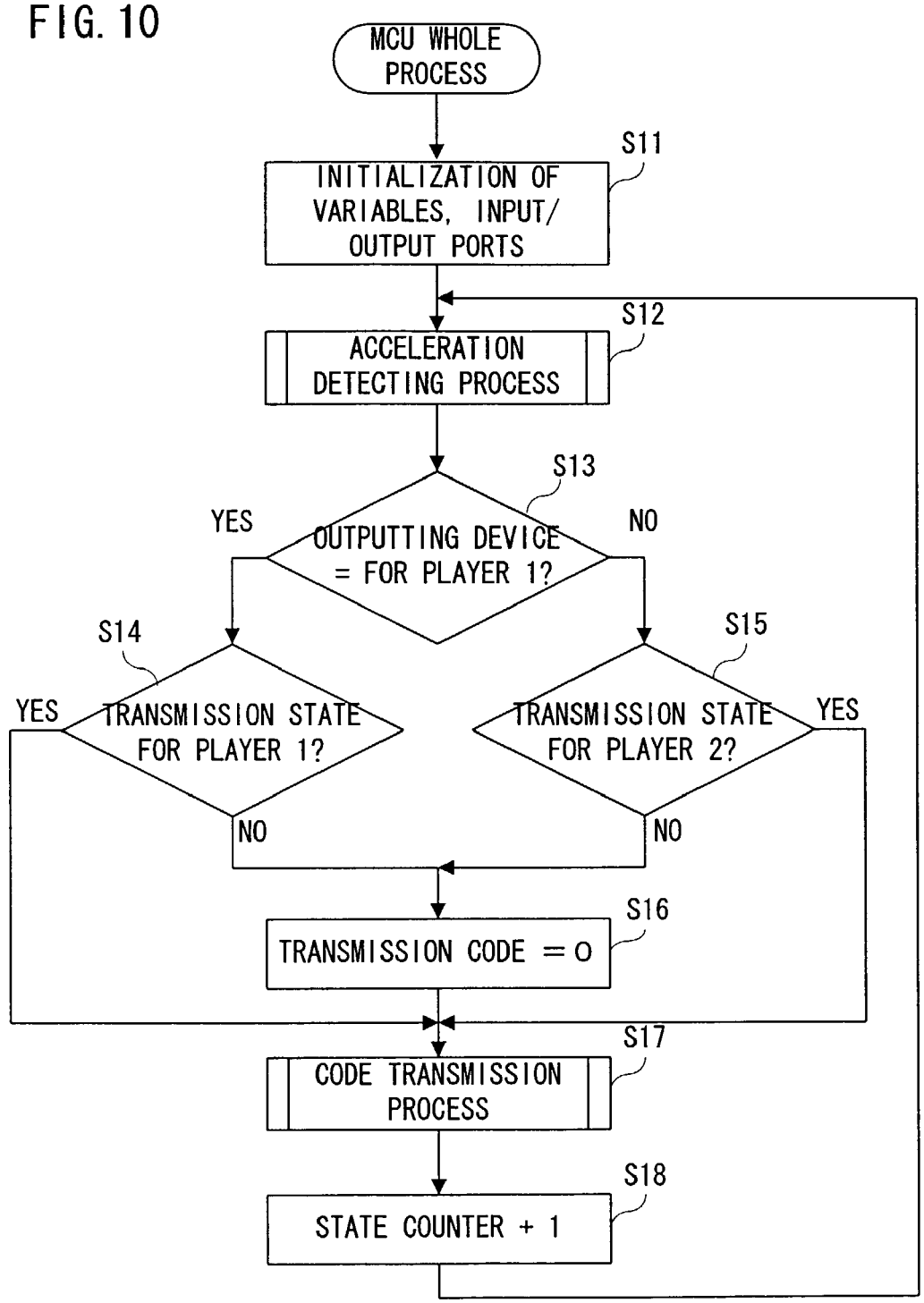
FIG. 10 is a flowchart showing a whole operation of an MCU provided in the signal outputting device.

A whole operation of the MCU 54 is described by referring to FIG. 10. The MCU 54 initializes variables (described later) to be handled by the MCU 54 such as a detection offset value, an offset counter, and so on, and also initializes the input ports and the output ports (FIG. 6) in a first step S11.

Subsequently, it is determined whether or not the signal outputting device 34 is of the player 1 in a step S13 through an acceleration detecting process in a step S12. If a specific input port of the MCU 54 is set to "1", this means the player 1, and if "0", this means the player 2, and therefore, it does not require more than to sense the specific input port of the MCU 54 in the step S13. Then, if "YES" is determined in the step S13, that is, in a case of the player 1, it is determined whether or not a transmission state in a step S14, and if "NO" is determined, that is, in a case of the player 2, it is determined whether or not a transmission state in a step S15.

Although not shown, the MCU 54 has a state counter as a software counter, and every time that the state counter becomes a predetermined value, it becomes a transmission state. Therefore, it is to determine whether or not the state counter becomes the predetermined value in the steps S14 and S15. In a case of "NO" in the step S14 or S15, a transmission code is rendered "0" in a step S16, and in a case of "YES" in the step S14 or S15, the process directly proceeds to a code transmission process in a step S17. The state counter (not shown) is incremented (+1) in a step S18 and the process returns to the step S12 after carrying out the code transmission process in the step S17. It is noted that the code transmission process is carried out in a bit-serial fashion as described later, but its required time is extremely a short time, e.g. several micro seconds or so.

Figure 11:
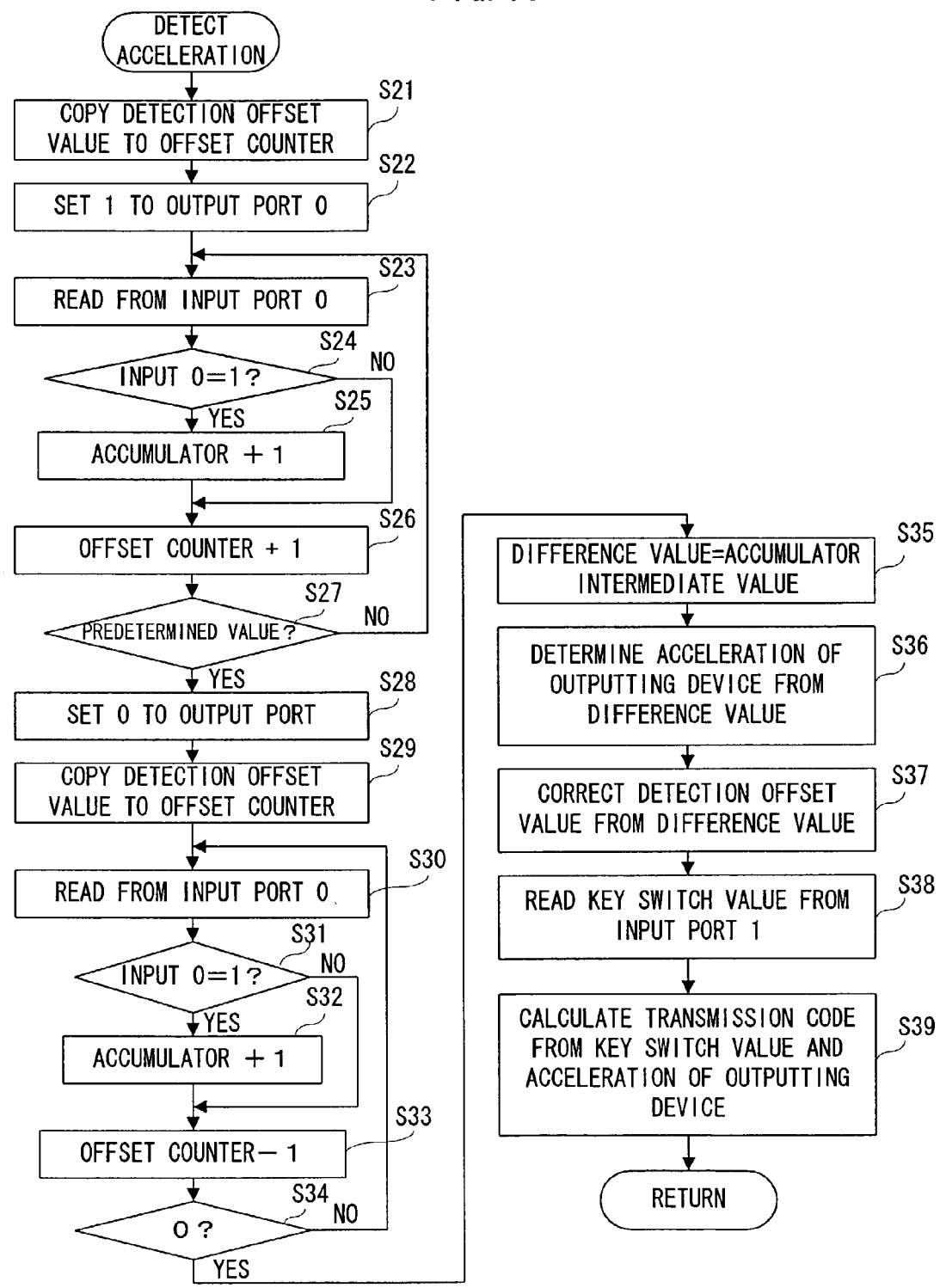
FIG. 11 is a flowchart showing a specific operation of an acceleration detecting process by the MCU.

The acceleration detecting process in the step S12 follows a subroutine shown in FIG. 11. In a first step S21, the MCU 54 copies the detection offset value set in a register (not shown) in an offset counter (not shown). The "detection offset value" is a value for inputting into equal parts with respect to time a high level and a low level of a rectangular waveform determination shown in FIG. 7(A) when no voltage is generated in the piezoelectric buzzer element 70, and the detection offset value is set as an arbitrary default value when the operation starts.

The MCU 54 sets "1" to the output port 0 in a step S22 succeeding to the step S21. That is, "1" or the high level is output. Next in a step S23, the MCU 54 reads data from the input port 0.

It is determined whether or not the data of the input port 0 read in the step S23 is "1" in a step S24. If "YES" is determined, the MCU 54 increments (+1) an accumulator (not shown) in a succeeding step S25. The "accumulator" is a counter for calculating a period when the high level is sensed, and incremented when the input port concerned is "1" or the high level while not affected when "0".

In a case that the accumulator is incremented in the step S25 or that "NO" is determined in the step S24, the MCU 54 increments the offset counter in a succeeding step S26, and determines whether or not a count value of the offset counter reaches a predetermined value in a succeeding step S27. Then, if "NO" is determined, the process returns to the step S23. Therefore, while "NO" is determined in the step S27 after setting "1" to the output port 0 in the step S22, the MCU 54 continuously outputs "1" from the output port 0.

Next, in a case that it is determined that the count value of the offset counter reaches the predetermined value in the step S27, the MCU 54 sets "0", that is, a low level to the output port 0 in a succeeding step S28. The MCU 54 copies the detection offset value being set in the register into the offset counter in a succeeding step S29.

In a succeeding step S30, the MCU 54 reads data from the input port 0. It is determined whether or not the data read from the input port 0 in the step S30 is "1" in a step S31. If "YES" is determined, the MCU 54 increments (+1) the accumulator in a succeeding step S32.

In a case that the accumulator is incremented in the step S32 or that "NO" is determined in the step S31, the MCU 54 decrements (−1) the offset counter in a succeeding step S33, and determines whether or not the count value of the offset counter reaches 0 (zero) in a succeeding step S34. Then, if "NO" is determined, the process returns to the step S30. Therefore, while "NO" is determined in the step S34 after setting "0" to the output port 0 in the step S28, the MCU 54 continuously outputs "0" from the output port 0.

Then, when "YES" is determined in the step S34, that is, the offset counter becomes zero (0), the MCU 54 evaluates a difference by subtracting an intermediate value from the count value of the accumulator in a succeeding step S35. Here, the "intermediate value" is "N/2" in a case that the total number of the number of the repeating times of the high level detection to be returned from the step S27 to the step S23 and the number of the repeating times of the low level detection to be returned from the step S34 to the step S30 are "N". A reason why the difference value is evaluated by using the intermediate value in the step S35 is that a ratio of a period of the high level and a period of the low level in a state where an ideal piezoelectric buzzer element is used and no acceleration correlation voltage is generated in the ideal piezoelectric buzzer element i.e. duty 50% is made as a reference of an acceleration determination.

To be described in detail, the accumulator indicates the number of times that "1" or the high level is read from the input port 0 as described above, and in a case of the ideal piezoelectric buzzer element, and that no voltage is generated, the difference of the "accumulator−(minus) intermediate value" in the step S35 is supposed to be 0. Contrary thereto, if a voltage of some level is generated in the piezoelectric buzzer element 70, a meaningful numerical value as the difference is obtained. Therefore, the displacement acceleration of the signal outputting device 34 is determined in accordance with the difference value in a step S36. Normally, acceleration data is obtained by multiplying the difference value data by a predetermined coefficient.

Subsequently, in a step S37, the detection offset value is corrected based on the difference value evaluated in the step S35. That is, the game player or the operator does not operate the signal outputting device 34 in an initial state, so that the acceleration correlation voltage is not generated in the piezoelectric buzzer element 70. That the difference value which is not 0 is detected in the step S35 in spite thereof indicates that the detection offset value set in the step S21 is not correct in view of a characteristic of the piezoelectric buzzer element used in the signal outputting device. That is, it means that the piezoelectric buzzer element does not have ideal characteristics. Therefore, in such a case, the detection offset value is corrected in accordance with the difference value in the step S37 in order to correct a deviance of each characteristic of the ideal piezoelectric buzzer element from each characteristic of an ideal piezoelectric buzzer element.

On the other hand, if the detection offset value is surely changed or corrected in the step S37, the detection offset value is to be corrected even if the difference value is a difference value as a result of the piezoelectric buzzer actually generating the acceleration correlation voltage. However, a voltage generating period of the piezoelectric buzzer element is very short compared to other periods. Therefore, there is no particular problem if carried out at each time that the difference value detection in the step S37. That is, since an appropriate correction is carried out at a time of starting an actual soccer game, a large variance is not produced in the detection offset value even if the step S37 is carried out in each case of the acceleration detection, and therefore, this does not pose any problem to the actual soccer game.

In a succeeding step S38, the MCU 54 reads a value "1" or "0" of the key switch, i.e. the push key 40 from the input port 1, and in a succeeding step S39, the MCU 54 calculates the transmission code based on a value from the key switch 40 and the displacement acceleration or the moving acceleration of the signal outputting device 34 determined in the preceding step S36, and by further adding a parity bit, and then returns to a main routine in the step S13 (FIG. 10).

Figure 12:
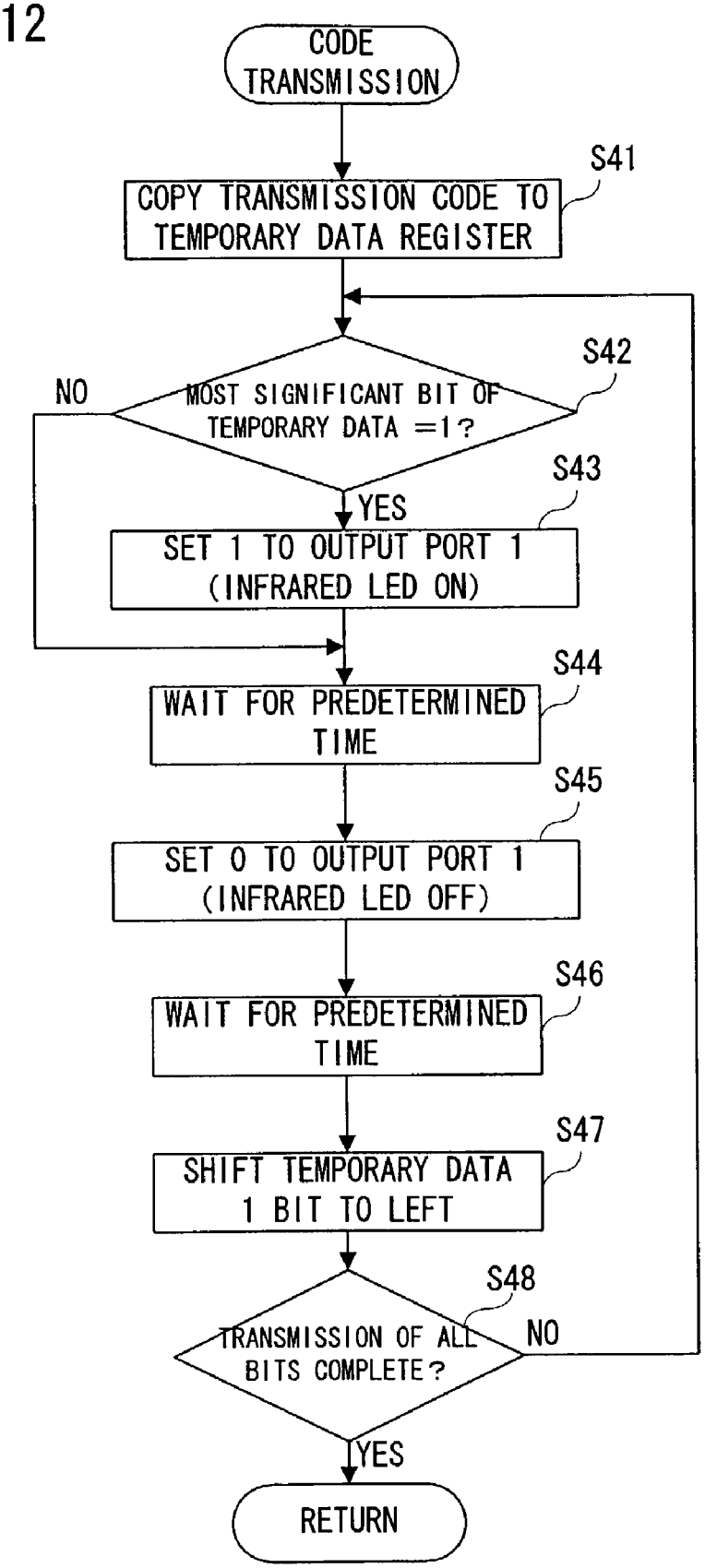
FIG. 12 is a flowchart showing a specific operation of a code transmission process by the MCU.

The code transmission process in the step S17 (FIG. 10) follows a subroutine shown in FIG. 12. In a first step S41, the MCU 54 copies into a temporary data register (not shown) the transmission code generated in the step S12 or S16. Then, it is determined whether or not its most significant bit is "1". If the most significant bit is "1", "YES" is determined in a step S42, and in a succeeding step S43, the MCU 54 sets "1" to the output port 1 and turns on the infrared LED 56 (FIG. 6). Subsequently, the process waits for a predetermined waiting time in a step S44. It is noted that if "NO" is determined in the step S42, that is, if the most significant bit is "0", the process directly proceeds to the step S44.

After the predetermined waiting time elapses in the step S44, the MCU 54 sets "0" to the output port 1 and turns off the infrared LED 56 in a step S45. Subsequently, the process waits for a predetermined waiting time to lapse in a step S46.

After the predetermined waiting time lapses in the step S46, the MCU 54 shifts the transmission mode in the temporary data register by one bit in a left direction so as to render a bit already transmitted a least significant bit in a step S47. That is, a transmission bit is changed for a bit serial transmission. Then, it is determined whether or not a transmission of all bits is completed in a step S48. If "NO" is determined, the process returns to the step S42, and if "YES" is determined, the process is ended, and then returns to the main routine.

Figure 13:
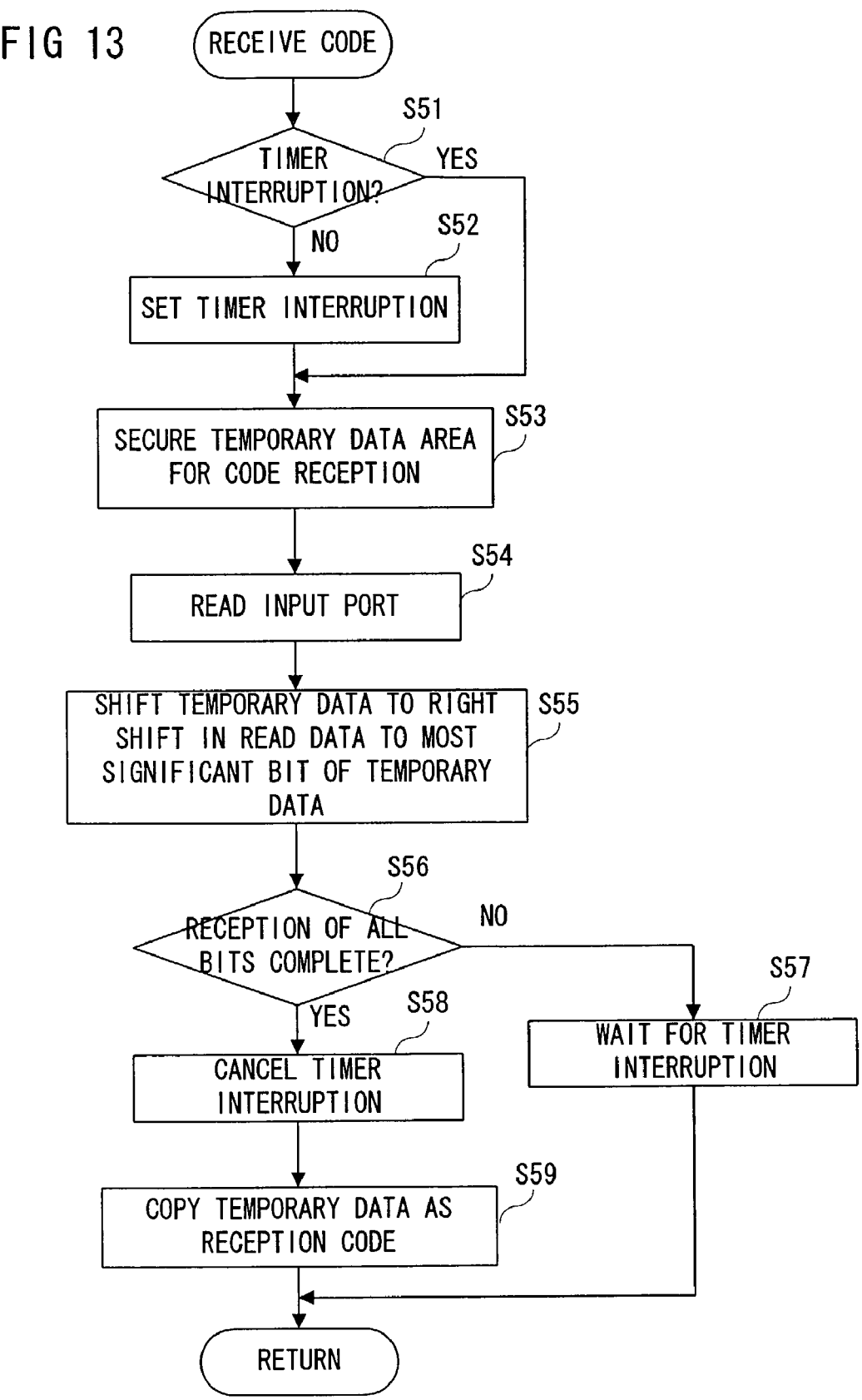
FIG. 13 is a flowchart showing a specific operation of a code receiving process by the game processor.

The code receiving process carried out by the game processor 58 in the step S10 in FIG. 8 follows a subroutine shown in FIG. 13. The code receiving process is processed by a timer interruption, so that it is determined whether or not the timer interruption is present in a first step S51. If "NO" is determined, the process sets the timer interruption in a step S52, and if "YES" is determined, the process directly proceeds to a step S53.

A temporary data area for code receiving is secured within the internal memory 60 (FIG. 4) in the step S53, and data of the input port to which the output signal from the infrared light-receiving portion 32 is input is read out in a step S54. In a succeeding step S55, the temporary data is shifted in a right direction so as to render the data read in the step S54 a most significant bit of the temporary data.

Subsequently, it is determined whether or not a reception of all bits is completed in a step S56, and if "NO" is determined, the process waits for a next timer interruption in a step S57. If "YES" is determined, the timer interruption is cancelled in a step S58, and temporary data is copied as a reception code in a step S59. The game processor 58 carries out a game process in FIG. 8 using the reception code.

Figure 14:
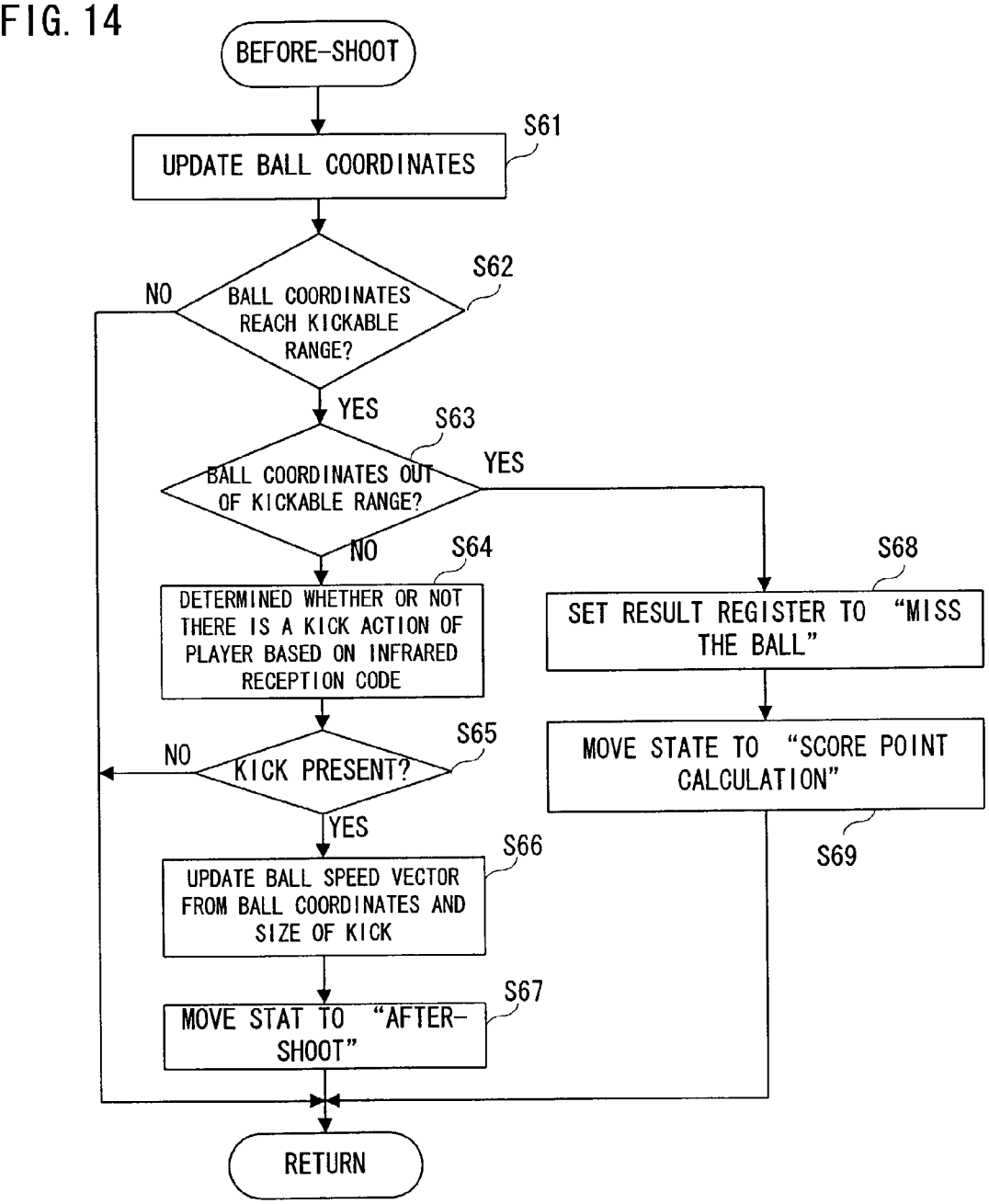
FIG. 14 is a flowchart showing a specific operation of a before-shoot process by the game processor.

As shown in the preceding FIG. 8, after selecting a game mode in the step S3, the game processor 58 carries out the before-shoot process in the succeeding step S4. More specifically, the before-shoot process is carried out in accordance with a flowchart shown in FIG. 14. In a first step S61, respective axial coordinates, Px, Py, and Pz of the soccer ball 44 are updated based on initial values of respective axial speeds, Vx, Vy, and Vz of the soccer ball 44. The soccer ball 44 moves towards the player from an oblique front right of the game screen. It is determined whether or not the soccer ball 44 has reached a kickable range based on the updated respective axial coordinates in a step S62, and it is determined whether or not the soccer ball 44 deviates from the kickable range based on the identical respective axial coordinates in a step S63.

The soccer ball 44 is passed towards the player from an oblique front right of the game screen, for example, and the soccer ball 44 is not rebounded even if the player kicked it when the soccer ball 44 does not come to a vicinity of player's feet or passes over the vicinity of the player's feet. Accordingly, the kickable range is previously set, and it is determined in what position the soccer ball 44 remains in the steps S62 and S63. If "NO" is determined in the step S62, the process directly returns to the main routine shown in FIG. 8. If "YES" is determined in the step S63, "miss the ball" is set to the result register (not shown) in a step S68, and the process returns to the main routine shown in FIG. 8 after moving a state to "score point calculation" in a step S69.

The process proceeds to a step S64 if "NO" is determined in the step S63, and it is determined whether or not there is a kicking action of the player based on the infrared reception code input via the infrared light-receiving portion 32. Then, the process directly returns to the main routine if there is no kicking, however, a speed vector of the soccer ball 44 is updated in a step S66 if there is a kicking. More specifically, based on the respective axial coordinates of the soccer ball 44 obtained when the displacement speed of the signal outputting device 34 becomes maximum by the kicking and a kicking speed calculated from a maximum value of the displacement speed concerned, respective axial speeds Vx, Vy, and Vz of the soccer ball 44 after being kicked are evaluated. Subsequently, the process returns to the main routine after moving the state to "after-shoot" in a step S67.

Figure 15:
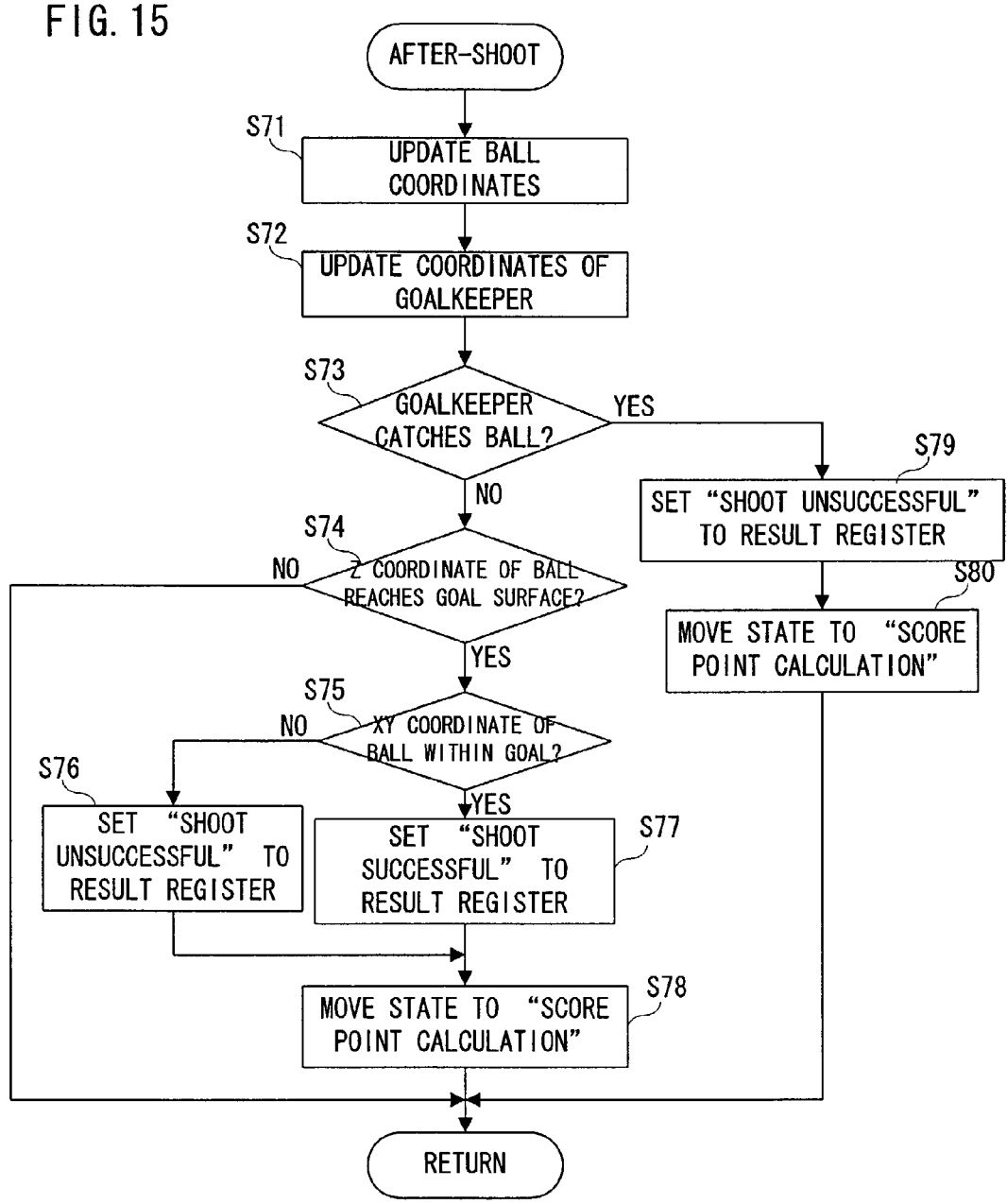
FIG. 15 is a flowchart showing a specific operation of an after-shoot process by the game processor.

The after-shoot process is carried out in accordance with a subroutine shown in FIG. 15. In a first step S71, the respective axial coordinates Px, Py, and Pz of the soccer ball 44 are updated based on the respective axial speeds of the ball and a gravitational acceleration determined in the above step S66. Next, a coordinate of the goalkeeper 46 is updated to an arbitrary position in a step S72. It is determined whether or not the goalkeeper 46 catches the soccer ball 44 in a step S73. "YES" is determined in the step S73 when a Z coordinate of the soccer ball 44 is coincident with a Z coordinate of the goalkeeper 46 and an XY coordinate of the soccer ball 44 is included within a predetermined range using a center XY coordinate of the goalkeeper 46 as a reference. At this time, "shoot unsuccessful" is set to the result register in a step S79, and the state is moved to the "score point calculation" in a step S80, and then the process returns to the main routine.

Meanwhile, when the goalkeeper 46 can not catch the soccer ball 44, that is, if the respective axial coordinates of the soccer ball 44 do not satisfy the aforementioned conditions, the process proceeds from the step S73 to a step S74 so as to determine whether or not the Z coordinate of the soccer ball 44 reaches a Z coordinate surface including the goal 50. Herein, if "NO" is determined, the process directly returns to the main routine. However, if "YES" is determined, it is determined whether or not the XY coordinate of the soccer ball 44 is included within an XY coordinate range of the goal 50 in a step S75. Then, if outside the XY coordinate range of the goal 50, "shoot unsuccessful" is set to the result register in a step S76. However, if within the XY coordinate range of the goal 50, "shoot successful" is set to the result register in a step S77. In a succeeding step S78, the state is moved to "score point calculation", and subsequently the process returns to the main routine.

Figure 16:
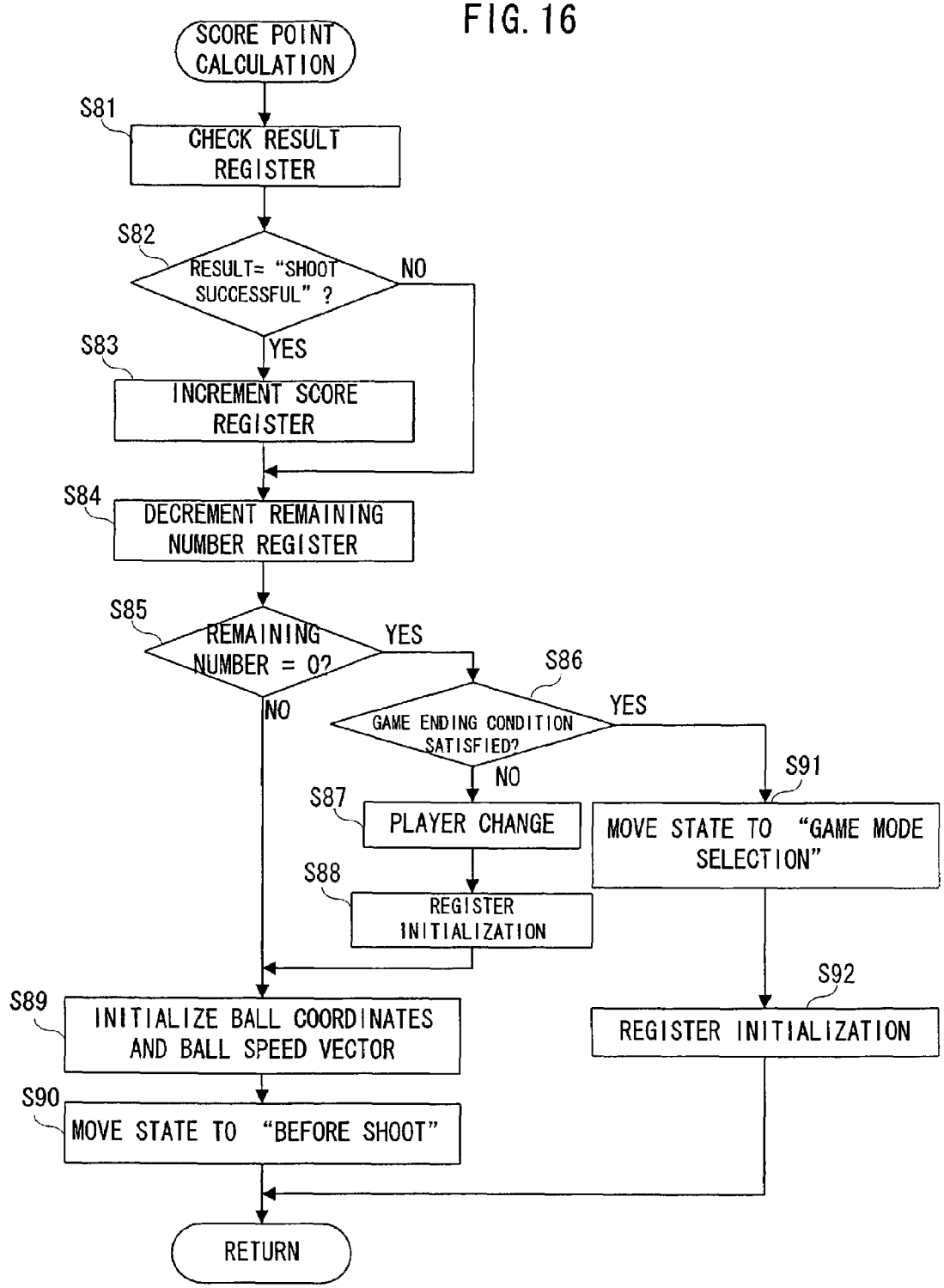
FIG. 16 is a flowchart showing a specific operation of a point calculation process by the game processor.

The score point calculation process is carried out in accordance with a subroutine shown in FIG. 16. Firstly, the result register is checked in a step S81, and its content is determined in a step S82. If the content is "shoot successful", the process proceeds to a step S84 after incrementing a score register (not shown) in a step S83. If the content is "shoot unsuccessful" or "miss the ball", the process directly proceeds to the step S84. In the step S84, a remaining number register (not shown) is decremented, and in a succeeding step S85, it is determined whether or not a value of the remaining number register becomes "0". An initial value of the remaining number register is "5", for example, and if the before-shoot process is carried out five times, then a value of the remaining number register becomes "0".

The process directly proceeds to a step S89 if "NO" is determined in the step S85, however, if "YES" is determined, it is determined whether or not a game ending condition is satisfied in a step S86. The game ending condition is that both the player 1 and the player 2 complete five consecutive shoots, for example. When this condition is not satisfied, the player is changed in a step S87. More specifically, if changed to the player 1 in the step S87, only the infrared reception data that a specific one bit shows "1" is made valid, and if changed to the player 2, only the infrared reception data that the specific one bit shows "0" is made valid. Upon completion of a process in the step S87, the process proceeds to a step S89 after initializing the result register, the point register, and the remaining number register in a step S88.

The respective axial coordinates of the soccer ball 44 are initialized in the step S89, and also an initial speed vector is applied to the soccer ball 44. The state is moved to "before-shoot" in a step S90, and subsequently, the process returns to the main routine. Therefore, the respective axial coordinates Px, Py, and Pz of the soccer ball 44 are renewed based on the initialized respective axial coordinates and the initial acceleration vector (respective axial speeds Vx, Vy, and Vz) in the step S61 for a next before-shoot process.

"YES" is determined in the step S86 when both the player 1 and 2 complete each five shoots, and the state is moved to "game mode selection" in a step S91. Then, the process returns to the main routine after initializing the result register, the score register, and the remaining number register in a step S92.

It is noted that in this embodiment, although one signal outputting device is assigned to one player, it is possible to accurately detect a movement of the player if two signal outputting devices are assigned to one player, thus attached to both legs, and the infrared signal is analyzed from these two devices.

Also, in this embodiment, it is intended to compete how many shoots are delivered to the goal. However, in addition thereto, it is possible to prepare a mode to reproduce a soccer match, to compete the number of liftings, and so on.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A soccer game apparatus for playing a soccer game by displaying on a television monitor screen at least a character of a soccer ball, comprising:

a signal outputting device that attaches to a player's leg and outputting an acceleration correlation signal correlated with an acceleration generated by movement of a player's leg to which said signal outputting device is attached, wherein said signal outputting device comprises a piezoelectric buzzer element having a main surface; and a game processor which receives said acceleration correlation signal so as to cause a change to said character of the soccer ball displayed on said screen, wherein said piezoelectric buzzer element is arranged on said signal outputting device such that when said signal outputting device is attached to a player's leg, said main surface of said piezoelectric buzzer element becomes perpendicular to a moving direction of said player's leg.

2. A soccer game apparatus according to claim 1, wherein said signal outputting device includes a digital signal generating means which generates a digital signal in accordance with said acceleration correlation signal, and a digital signal transmitting means which transmits said digital signal to said game processor.

3. A soccer game apparatus according to claim 2, wherein said digital signal transmitting means includes a wireless signal transmitting means which wirelessly transmits said digital signal to said game processor.

4. A soccer game apparatus according to claim 1, wherein said piezoelectric buzzer element includes a metal plate and a piezoelectric ceramic plate provided on said metal plate, and is arranged on said signal outputting device in such a manner that a main surface of said piezoelectric ceramic plate is perpendicular to a displacing direction of said leg upon being attached to said leg.

5. A soccer game apparatus according to claim 1, wherein said game processor determines that a kick has been performed by said player at a time that said acceleration correlation signal received from said signal outputting device reaches a peak, determines that the player missed the ball with the kick when coordinates of the soccer ball do not exist within kickable range at said time, evaluates a moving parameter of the soccer ball when the coordinates of the soccer ball exist within said kickable range at said time, and moves the character of the soccer ball on said screen in accordance with said moving parameter.

6. A soccer game apparatus according to claim 5, wherein said game processor evaluates respective axial speeds of the soccer ball after kicking on the basis of the respective axial coordinates of the soccer ball at said time and a kicking speed calculated from a maximum value of the acceleration correlation signal, and moves the character of the soccer ball on said screen on the basis of said respective axial speeds.

7. A soccer game apparatus according to claim 6, wherein said game processor updates respective axial coordinates of the soccer ball based on said respective axial speeds of the ball and a gravitational acceleration.

8. A soccer game apparatus according to claim 1, wherein said game processor updates a coordinate of a goalkeeper displayed on the screen to an arbitrary position, and determines whether or not the goalkeeper catches the soccer ball based on said coordinate of the goalkeeper and at least a part of respective axial coordinates of the soccer ball.

9. A soccer game apparatus according to claim 8, wherein said game processor determines whether or not said goalkeeper catches said soccer ball by determining whether a Z coordinate of the soccer ball has a predetermined relationship with a Z coordinate of the goalkeeper and an XY coordinate of the soccer ball is included within a predetermined range of an XY coordinate of the goalkeeper.

10. A soccer game apparatus according to claim 9, wherein said game processor further determines when it is determined that said goalkeeper could not catch said ball, whether or not the Z coordinates of said soccer ball has reached a Z coordinates plane including a goal, and if it is determined that the Z coordinates of said soccer ball has reached said Z coordinates plane, further determines whether or not the XY coordinates are included in an XY coordinates range of said goal so as to determine a shoot failure in a case that the XY coordinates are not included in the XY coordinates range of said goal or a shoot successful in a case that the XY coordinates are included in the XY coordinates range of said goal.

* * * * *